United States Patent [19]

Hansen et al.

[11] 4,290,020

[45] Sep. 15, 1981

[54] METHOD AND APPARATUS FOR DETECTING SUBTERRANEAN ANOMALIES BY GENERATING TWO PARALLEL MAGNETIC FIELDS

[75] Inventors: Peder M. Hansen; John G. Hoffman; Elwin W. Seeley; Wesley A. Andrew, all of San Diego, Calif.

[73] Assignee: The United States of America as represented by the Secretary of the Navy, Washington, D.C.

[21] Appl. No.: 31,721

[22] Filed: Apr. 20, 1979

[51] Int. Cl.³ .............................................. G01V 3/08
[52] U.S. Cl. ...................................... 324/334; 324/345
[58] Field of Search ............... 324/334, 359, 326, 345, 324/67, 225, 335

[56] References Cited

U.S. PATENT DOCUMENTS

| | | | |
|---|---|---|---|
| 1,660,774 | 2/1928 | Vos et al. | 324/359 |
| 1,676,847 | 7/1928 | Zuschlag | 324/359 |
| 1,678,489 | 7/1928 | Sundberg | 324/334 |
| 2,015,401 | 9/1935 | Jakosky | 324/359 X |
| 2,560,834 | 7/1951 | Whitehead et al. | 324/225 X |
| 2,731,596 | 1/1956 | Wait et al. | 324/335 |
| 3,035,772 | 5/1962 | Hough et al. | 324/334 X |
| 3,289,076 | 11/1966 | Edis et al. | 324/52 |
| 3,860,866 | 1/1975 | Dornberger | 324/52 |
| 4,079,309 | 3/1978 | Seeley | 324/359 X |

FOREIGN PATENT DOCUMENTS

| | | | |
|---|---|---|---|
| 21610 | 9/1913 | United Kingdom | 324/334 |
| 223540 | 8/1924 | United Kingdom | 324/334 |

Primary Examiner—Gerard R. Strecker
Attorney, Agent, or Firm—Richard S. Sciascia; Ervin F. Johnston; Thomas M. Phillips

[57] ABSTRACT

Improved method and apparatus for detecting anomalies beneath an area of the earth's surface wherein an oscillator couples a current into two conductors laid parallel to each other to generate two magnetic fields in the earth beneath the area. The magnetic field is measured along a line midway between the two horizontal conductors to detect for an increase in the measured field which is an indication of the presence of an anomaly.

2 Claims, 5 Drawing Figures

METHOD AND APPARATUS FOR DETECTING SUBTERRANEAN ANOMALIES BY GENERATING TWO PARALLEL MAGNETIC FIELDS

BACKGROUND OF THE INVENTION

The present invention relates to a method and apparatus for the detection and location of subterranean anomalies, and particularly, to such method and apparatus for detecting tunnels or other void spaces within the earth.

Geological surveying by electromagnetic means has been done for many years. The techniques that have been used involved the detection of changes in the earth's resistivity by measurements in mutual coupling between a transmitter antenna (i.e., a long wire or small horizontal loop) and a receive antenna located on or near the earth's surface. This technique works well for large anomalies (i.e. gravel pits, large oil or ore deposits, etc.) and small anomalies located near the earth's surface. The technique involves an averaging of the earth's resistivity and how much an anomaly will change this total average. Another technique involves generation of parallel magnetic fields in separate conductors by driving them with out of phase currents. This method is exemplified by U.S. Pat. No. 1,660,774 issued to M. Voss et al. Another method involves the drilling of two boreholes parallel to one another and doing transmission line experiments. This technique is useful but expensive to implement considering the cost of drilling.

SUMMARY OF THE INVENTION

The present invention provides for the detection and location of subterranean anomalies. Two magnetic fields are established by passing in-phase currents through two parallel wires laid out horizontally on the earth's surface or by passing current through a single conductor arranged as a rectangular loop. Magnetic field null measurements are made along a center line between the parallel wires on the long sides of the loop. The presence of a subterranean anomaly warps or distorts the magnetic fields and causes the signal level to increase when the measurement is made over the anomaly.

OBJECTS OF THE INVENTION

An object of the present invention is to provide an improved system for detecting subterranean anomalies.

Another object of the invention is to provide an improved system for detecting the presence of a tunnel beneath the given area.

A further object of the invention is the provision of an improved method and apparatus for detecting anomalies below the earth's surface using a nulling technique which allows for cancelation of large surface effects and permits detection of small anomalies.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
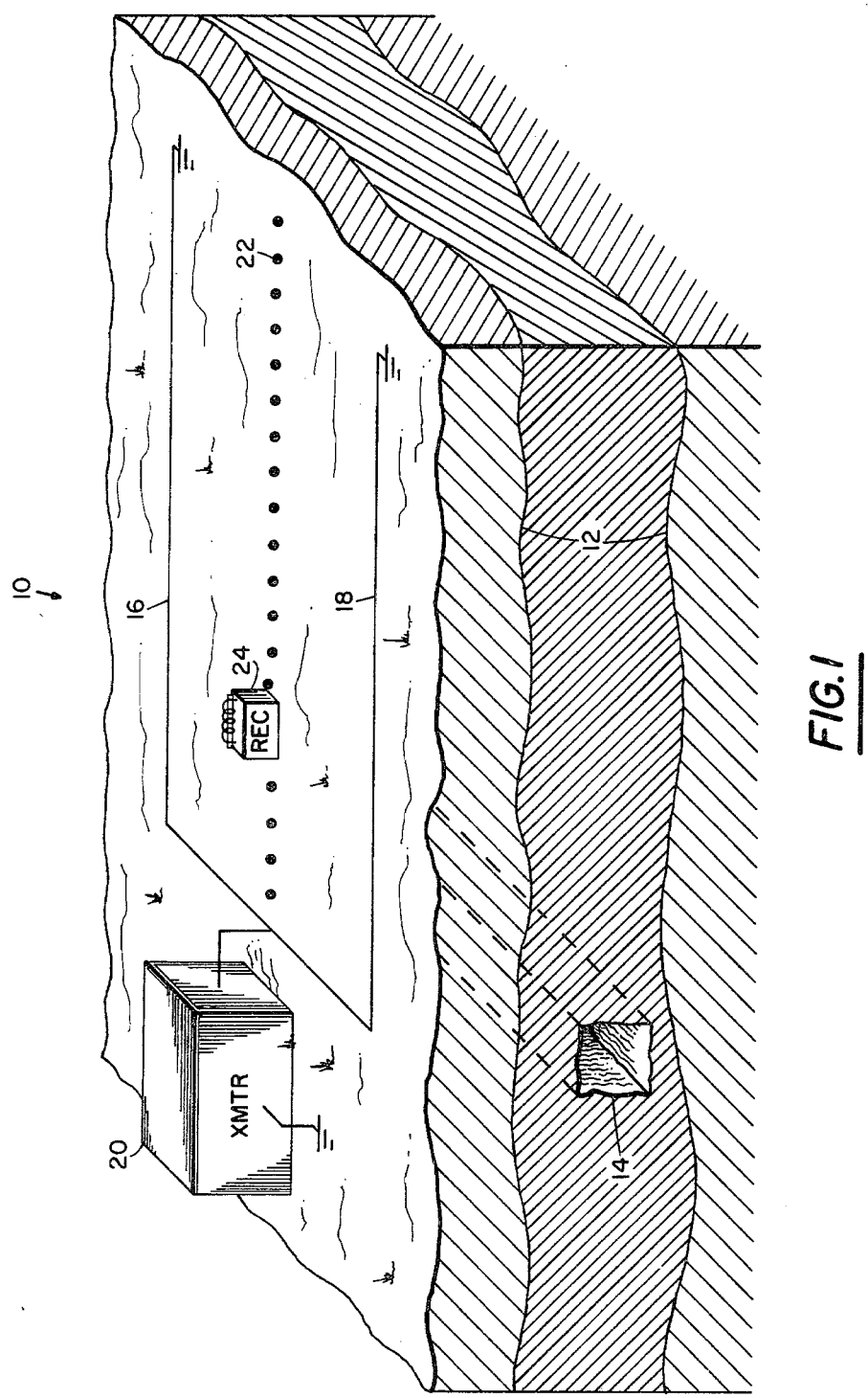
FIG. 1 shows an embodiment of the invention using the vertical null technique.

Referring now to FIG. 1, there is shown an area of the earth's surface and the subsurface region beneath it which comprises arbitrary strata or other solid matter separated by lines 12. Tunnel 14 which may be an open-ended passageway or other space devoid of solid matter passes through the subsurface region beneath area 10 at depths which may be in excess of 170 feet, the cross-sectional dimension of tunnel 14 being arbitrary. In addition, tunnel 14 may or may not contain a linear conductive structure such as steel tracks.

In the configuration shown in FIG. 1, two long (~500 meters) parallel wires, 16 and 18 are laid out on the ground parallel to each other with each terminated in their characteristic impedance to ensure uniform, in-phase currents in both wires. Conductors or wires 16 and 18 are fed by means of a transmitter 20.

Transmitter 20 supplies an alternating current to conductors 16 and 18 which in the configuration of FIG. 1 will produce fields that are equal and opposite along the center line 22 between the two wires producing a resultant null in the vertical magnetic field. Any asymmetrical properties in the geology, as for example, tunnel 14 in FIG. 1 will produce a horizontal shift in the vertical null position resulting in an increase in the measured field along the center line between the two wire configuration. As shown in FIG. 1, the magnetic field is measured along a center line 22 by means of a receiver 24 which includes a ferrite loop antenna and tuned volt meter.

Figure 2:
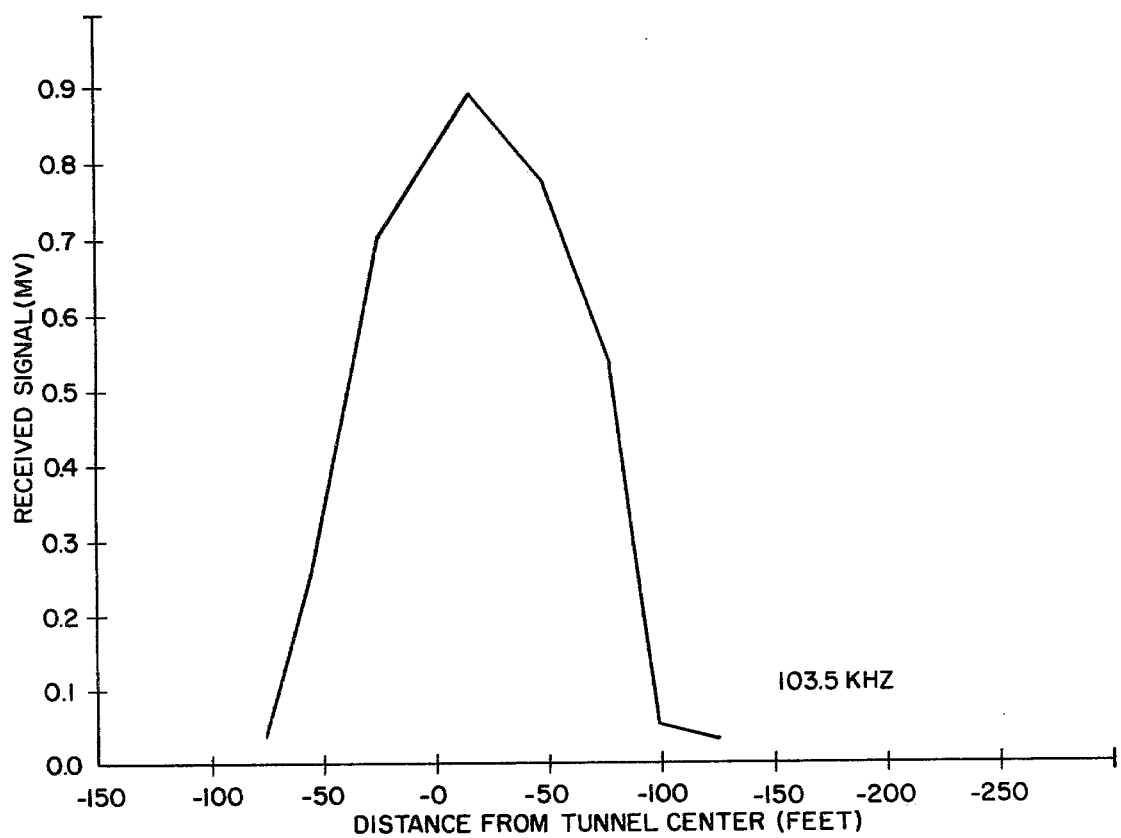
FIG. 2 is a graph of measurements made according to the embodiment of FIG. 1.

FIG. 2 is a graph of the null voltages as a function of distance from the center of the empty tunnel shown in FIG. 1. As can be seen, the maximum reading occurs directly above the center of the tunnel indicating maximum shift of the vertical null caused by the presence of the tunnel.

Figure 3:
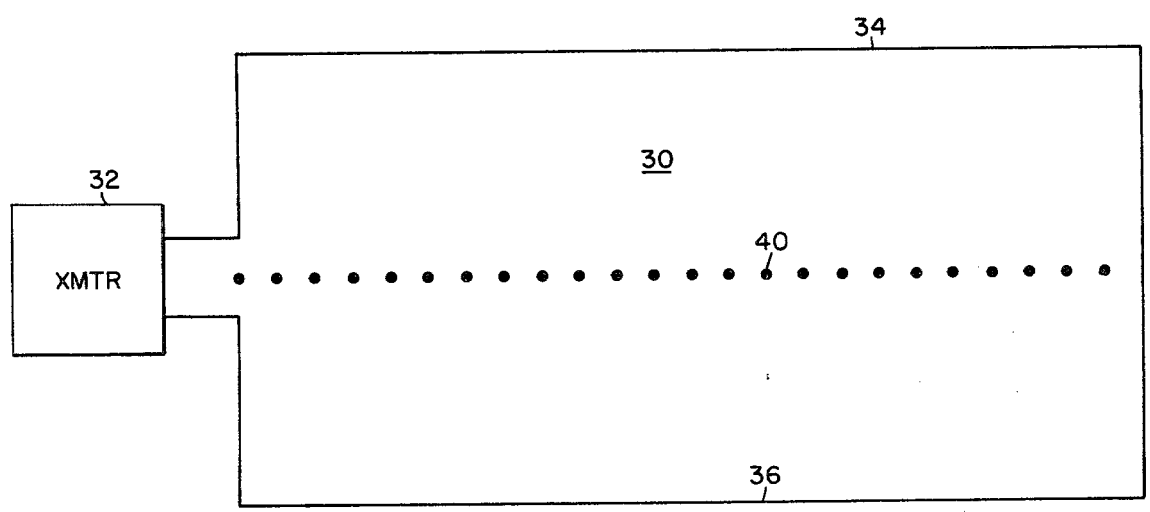
FIG. 3 is an embodiment using the horizontal loop or horizontal null technique.
Figure 4:
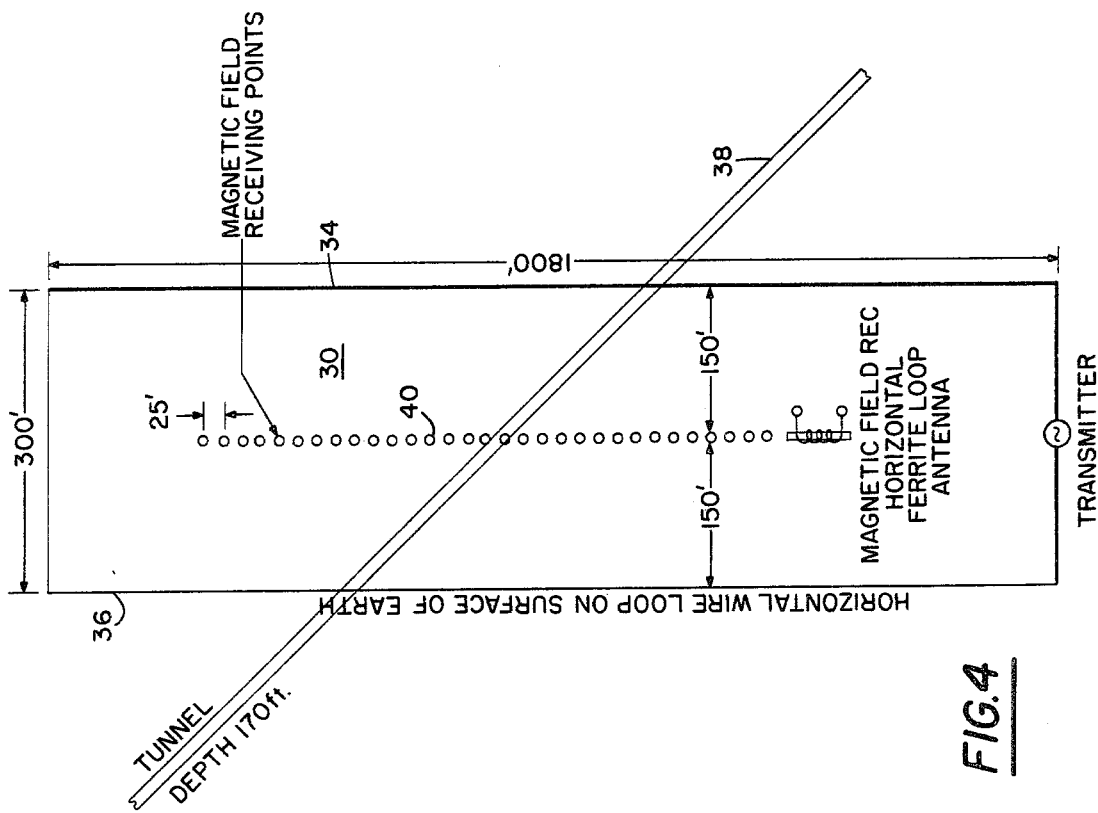
FIG. 4 shows the embodiment of FIG. 3 used to detect a railroad tunnel.

The embodiment shown in FIGS. 3 and 4 comprises a large rectangular loop 30 laid out on the ground with the transmitter 32 inserted in one end to provide out-of-phase currents in the long side wires of 34 and 36 of the loop. As shown in FIG. 4, the long side wires 34 and 36 are oriented at about 45° to the tunnel 38. Any angle but zero degrees has been found to work satisfactorily. This embodiment has been found to work in situations where metal may be present as, for example, railroad tracks in a railroad tunnel. Since the current components flowing in the side wires 34 and 36 are 180° out of phase, the null measurements made along the center line 40 detect a horizontal null.

The operation of the two systems is essentially the same, any asymmetric anomaly will cause a shift in the location of the horizontal or vertical field at the measurement center line.

In practice, the embodiment of FIG. 1 has been found to be more satisfactory in detecting voids while the embodiment of FIGS. 3 and 4 has been found satisfactory to detect voids where metal is present. The frequency of the current flowing in the parallel wires may range from 10 kHz to 110 kHz and may be generated by means of a Hewlett-Packard HP204B signal generator fed into a power amplifier to feed a low level signal ranging from 7-150 milliamperes.

The ferrite antenna of the receiver 20 should be mounted such that it is rotatable for locating minimum signals in the plane perpendicular to the long wires 16 and 18 of FIG. 1 and horizontal to the two long wires 34 and 36 of the horizontal loop of FIGS. 3 and 4.

Figure 5:
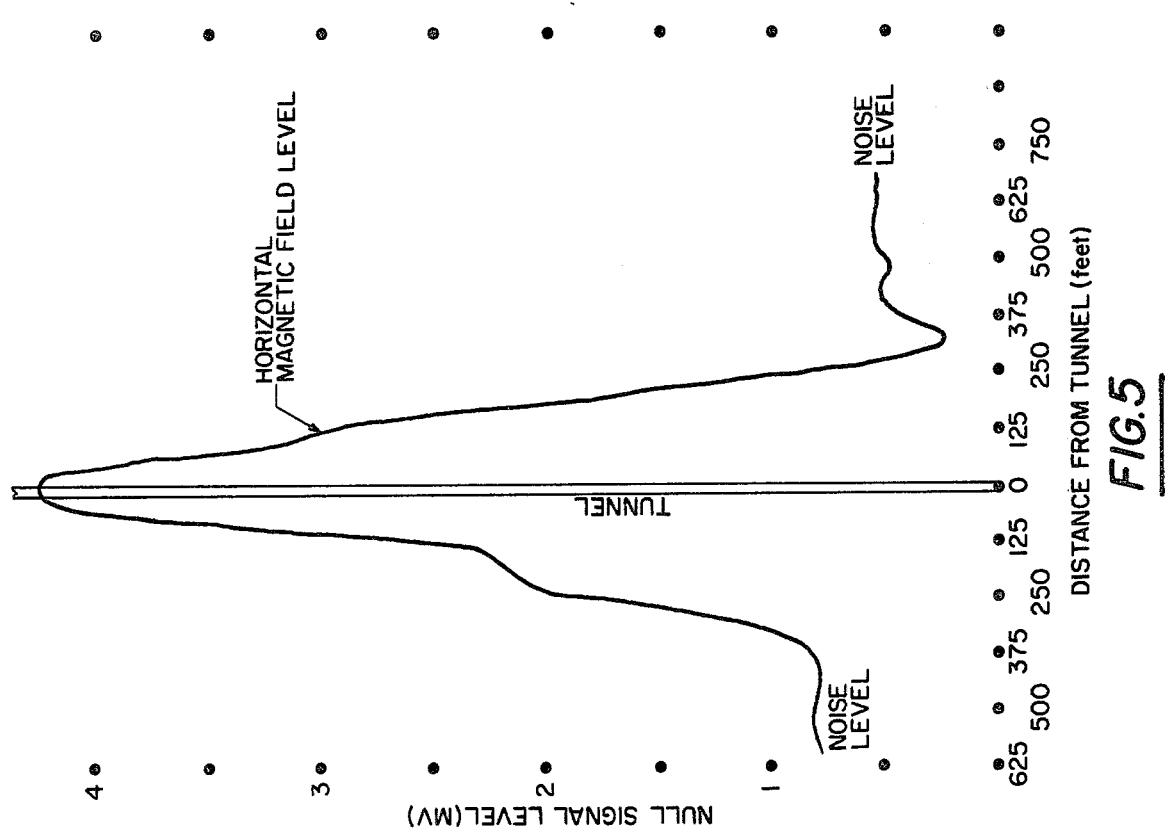
FIG. 5 is a graph of measurements taken over a tunnel in accordance with the embodiment of FIGS. 3 and 4.

FIG. 5 is a graph of the null voltage as a function of distance from the center of a tunnel in which railroad tracks are present. As stated above, the rectangular loop is at approximately 45° to the tunnel 38. The presence of the tunnel warps the magnetic fields and causes the signal level to increase to a maximum over the tunnel as shown in FIG. 5. The equipment should be calibrated to be nulled to the noise level in the absence of a tunnel. This is done by measurements taken a great distance from the known location of tunnel as shown in FIG. 5.

Obviously, many other modifications and variations of the present invention are possible in the light of the above teachings. It is therefore to be understood that within the scope of the appended claims the invention may be practiced otherwise than as specifically described.

What is claimed is:

1. In the method of detecting subterranean anomalies wherein two parallel magnetic fields are generated and the strength of the field resulting from their intersection along a centerline midway between the fields is measured, the improvement comprising the step of:

generating the fields by means of a pair of substantially parallel conductors placed on the earth in the vicinity of a suspected anomaly through which conductors uniform, in-phase currents are caused to flow by connecting each conductor at one end to the same terminal of a source of alternating current, and terminating each conductor at its other end in its characteristic impedance.

2. In an apparatus for detecting subterranean anomalies wherein two parallel magnetic fields are generated and the strength of the field resulting from their intersection along a centerline midway between the fields is measured, the improvement comprising:

a source of alternating current having one grounded terminal and another, nongrounded terminal; and a pair of substantially parallel conductors placed on the earth in the vicinity of a suspected anomaly, each conductor being connected at one end to the nongrounded terminal of the current source and at the other end in its characteristic impedance;

whereby, uniform in-phase currents flow in the conductors generating a magnetic field around each conductor.

* * * * *